United States Patent
Flamm et al.

(10) Patent No.: US 6,340,128 B1
(45) Date of Patent: Jan. 22, 2002

(54) DEVICE FOR COMPENSATING A TENSILE YARN FORCE SENSOR

(75) Inventors: Franz-Josef Flamm, Stolberg; Christian Sturm, Krefeld, both of (DE)

(73) Assignee: W. Schlafhorst AG & Co. (DE)

(*) Notice: Subject to any disclaimer, the term of this patent is extended or adjusted under 35 U.S.C. 154(b) by 0 days.

(21) Appl. No.: 09/648,583

(22) Filed: Aug. 25, 2000

(30) Foreign Application Priority Data

Aug. 25, 1999 (DE) .......................... 199 40 161

(51) Int. Cl.$^7$ .......................... B65H 59/38; B65H 54/71
(52) U.S. Cl. .................... 242/413.5; 242/487.1
(58) Field of Search .................. 242/413.5, 413.6, 242/414, 487.1

(56) References Cited

U.S. PATENT DOCUMENTS

| | | | |
|---|---|---|---|
| 3,931,938 A | | 1/1976 | Hasegawa et al. |
| 4,184,646 A | * | 1/1980 | Seney ...................... 242/413.5 |
| 4,245,794 A | * | 1/1981 | Hasegawa et al. ... 242/413.5 X |
| 4,830,296 A | * | 5/1989 | Ueda et al. ............... 242/487.1 |
| 4,984,749 A | * | 1/1991 | Matsui et al. ............... 242/410 |
| 5,164,710 A | | 11/1992 | Anderegg et al. |
| 5,301,886 A | * | 4/1994 | Kathke et al. ........... 242/487.1 |
| 5,301,887 A | * | 4/1994 | Wirtz et al. ............... 242/412.1 |
| 5,329,822 A | | 7/1994 | Hartel et al. |
| 5,738,295 A | | 4/1998 | Flamm et al. |
| 6,105,895 A | * | 8/2000 | Schmodde et al. ....... 242/420.6 |

FOREIGN PATENT DOCUMENTS

| | | |
|---|---|---|
| DE | 1946023 | 12/1970 |
| DE | 28 39 328 A1 | 3/1980 |
| DE | 39 42 685 A1 | 6/1991 |
| DE | 40 25 005 A1 | 2/1992 |
| DE | 40 30 892 A1 | 4/1992 |
| DE | 41 29 803 A1 | 3/1993 |
| DE | 195 00 517 A1 | 7/1995 |
| DE | 195 44 202 A1 | 6/1997 |
| DE | 198 11 241 A1 | 9/1999 |

OTHER PUBLICATIONS

German Search Report.

* cited by examiner

*Primary Examiner*—Michael R. Mansen
(74) *Attorney, Agent, or Firm*—Kennedy Covington Lobdell & Hickman, LLP

(57) ABSTRACT

A tensile yarn force sensor (7) has a measuring member (17), with which the tensile force of a traveling yarn (1) is detected as a function of the measurable pressure the yarn (1) exerts on the measuring member (17) during winding onto a cheese (2) at the work station of a multi-station textile machine, e.g., a winding machine or a combined spinning/winding machine. At preselectable intervals, a control device (11) actuates cutting of the traveling yarn (1), and triggers the performance of a zero compensation at the measuring member (17) thereby relieved of the yarn pressure, whereby external influences on the measured result are sufficiently compensated by the zero compensation, even if the chronological sequence of bobbin changes, yarn breaks or cleaning cuts triggered by imperfections in the yarn alone do not offer a sufficient opportunity for performing the required zero compensations.

4 Claims, 1 Drawing Sheet

DEVICE FOR COMPENSATING A TENSILE YARN FORCE SENSOR

CROSS REFERENCE TO RELATED APPLICATIONS

This application claims the benefit of German Application DE 19940161.6 filed Aug. 25, 1999, herein incorporated by reference.

FIELD OF THE INVENTION

The present invention relates generally to a device for compensating a tensile yarn force sensor and, more particularly, to such a device having a measuring member by means of which the tensile force of a traveling yarn is detected at a work station of a multi-station textile machine in the course of being wound on a cheese, and wherein during the detection process the traveling yarn is arranged in a measuring position such that its exerts a measurable pressure on the measuring member.

BACKGROUND OF THE INVENTION

When producing a cheese, for example on an automatic open-end spinning/winding machine, the yarn feed device thereof is usually set to provide a uniform yarn feed. Therefore the cheese could theoretically run at a constant circumferential speed. In actuality, however, fluctuations of the yarn tension occur. These fluctuations result, for example, from the oblique placement of the yarn in the course of the cross winding of the yarn, from piecing processes, and from restarting processes following a yarn break. Possible effects of a malfunction can be compensated by controlling the drive mechanism of the cheese as a function of the yarn tension.

Thus, the yarn tension is of great importance for the quality of the cheese. The winding tension is often regulated by adjusting the number of revolutions of the cheese in the winding device as a function of the yarn feed speed determined by a yarn feed device. If it is intended in this manner to assure the adherence to the winding tension by the use of mathematical functions, it is necessary to take yarn-specific factors into account, such as material, yarn number, yarn twist or yarn tension, which can have a strong effect on the result. In cases in which the tension is only empirically determined, the result is not always sufficiently accurate. In contrast thereto, exact measurement results without a loss in time are available when the yarn tension is detected by means of a tensile force sensor.

Tensile yarn force sensors have been known for a long time in connection with textile machines and are used, besides the measuring of the yarn tension, also to detect yarn breaks, or directly for controlling the tensile yarn force by means of a yarn tensioner. Such tensile yarn force sensors are known, for example, from German Patent Publications DE 41 29 803 A1 or DE 195 44 202 A1. German Patent Publication DE 195 44 202 A1 shows a winding station of an automatic winding device with a tensile yarn force regulating device, by means of which the yarn tension can be regulated to a desired value. A comb tensioner performs the function of a yarn tensioner and the function of a tensile yarn force sensor. German Patent Publication DE 41 29 803 A1 describes a tensile yarn force sensor for a textile machine which is suitable for measuring the tensile yarn force of rapidly moving yarn, and by means of which high-frequency tensile yarn force fluctuations can also be detected.

In order to prevent a loss of the quality of the cheese, it is necessary to assure the adherence to the respectively required winding tension. To this end the precise functioning of the tensile yarn force sensor and a dependable measurement result must be assured. One of the prerequisites for receiving a dependable measurement result is the elimination of external influences on the measuring system. External influences, for example thermal changes, lead to errors in the measuring signal. Compensating devices and compensation methods, which assure the stability of the measurement results over several hours, can only be found in expensive laboratory measuring systems. No use is made of such compensating devices in connection with mass-produced machines, in particular at the work stations of a multi-station textile machine, for economical reasons because of the high cost of such compensating devices. However, the external influences can be eliminated in a less elaborate manner by a zero compensation.

In case of a yarn break or a cop change in a winding machine, the measuring member of the tensile force sensor is not acted upon by any force. Therefore this phase is suitable for performing a zero compensation. If a zero compensation is performed after every yarn break or cop change, it is possible to expect at most approximately ten minutes until the next zero compensation, even at long cop running times. This is sufficient for many designs of tensile force sensors and leads to usable results.

Considerably longer running times without a yarn break or a feed cop or finished bobbin change occur in connection with automatic spinning/winding devices of the type for producing cheeses or in the course of yarn withdrawal from a cheese in a winding machine. As a result, the phases during which no force is exerted on the measuring member of the tensile force sensor are more infrequent, and therefore considerably longer intervals occur between successive zero compensation operations. This leads to an impairment of the dependability of the results in the course of determining the tensile yarn force, and can result in an undesired lack of quality of the cheese.

OBJECT AND SUMMARY OF THE INVENTION

It is accordingly an object of the present invention to provide a device for compensating a tensile yarn force sensor which will reduce or prevent the above disadvantages and will improve the dependability of the results of the determination of the tensile yarn force. This object is attained by means of a device wherein a zero compensation can be automatically initiated at preselectable times by means of a control device which, at the selected times, actuates an intentional cutting of the traveling yarn and actuates the performance of a zero compensation at the respective measuring member which has thereby been relieved of any yarn tension input. Thus, performance of a zero compensation is no longer tied to an interruption of the yarn travel by a bobbin or cop change, a yarn break or by a cleaning cut triggered because of a lack of quality. The intervals between successive zero compensations can be limited to a value which reduces external influences to a minimum or even totally compensates these influences. It is possible in this manner to prevent an impairment of the dependability of the results in the course of determining the tensile yarn force, or the dependability of the results can be improved.

A yarn cleaner, which is already present at the work station in conventional machines, is preferably controlled by the control device to execute the periodic cleaning cuts for actuating a subsequent zero compensation upon each such yarn cut. Advantageously, therefore, the present invention uses available existing components.

The unavoidable interruptions caused by bobbin and cop changes, yarn breaks or cleaning cuts triggered because of a lack of quality, can be used for additional zero compensations. Thus, the control device of the present invention preferably does not trigger the performance of a zero compensation at regular intervals, but rather only after a preselectable period of time elapses since the termination of the last zero compensation. Following an unplanned zero compensation, the next preplanned zero compensation can, for example, be advantageously delayed until a later time without having to accept disadvantages in connection with the dependability of measuring. This aids the achievement of the highest possible productivity.

As will thus be understood, the device of the present invention makes it possible to prevent the impairment of the dependability of the measured result of a tensile yarn force sensor in various textile yarn handling operations, e.g., in the course of drawing off yarn from a cheese of a winding machine, or in connection with automatic spinning/winding devices, which produce cheeses.

Further details, features and advantages of the present invention will be described and understood from the disclosure of an exemplary embodiment of the invention set forth below with reference to the accompanying drawing.

DETAILED DESCRIPTION OF THE PREFERRED EMBODIMENT

Figure 1:
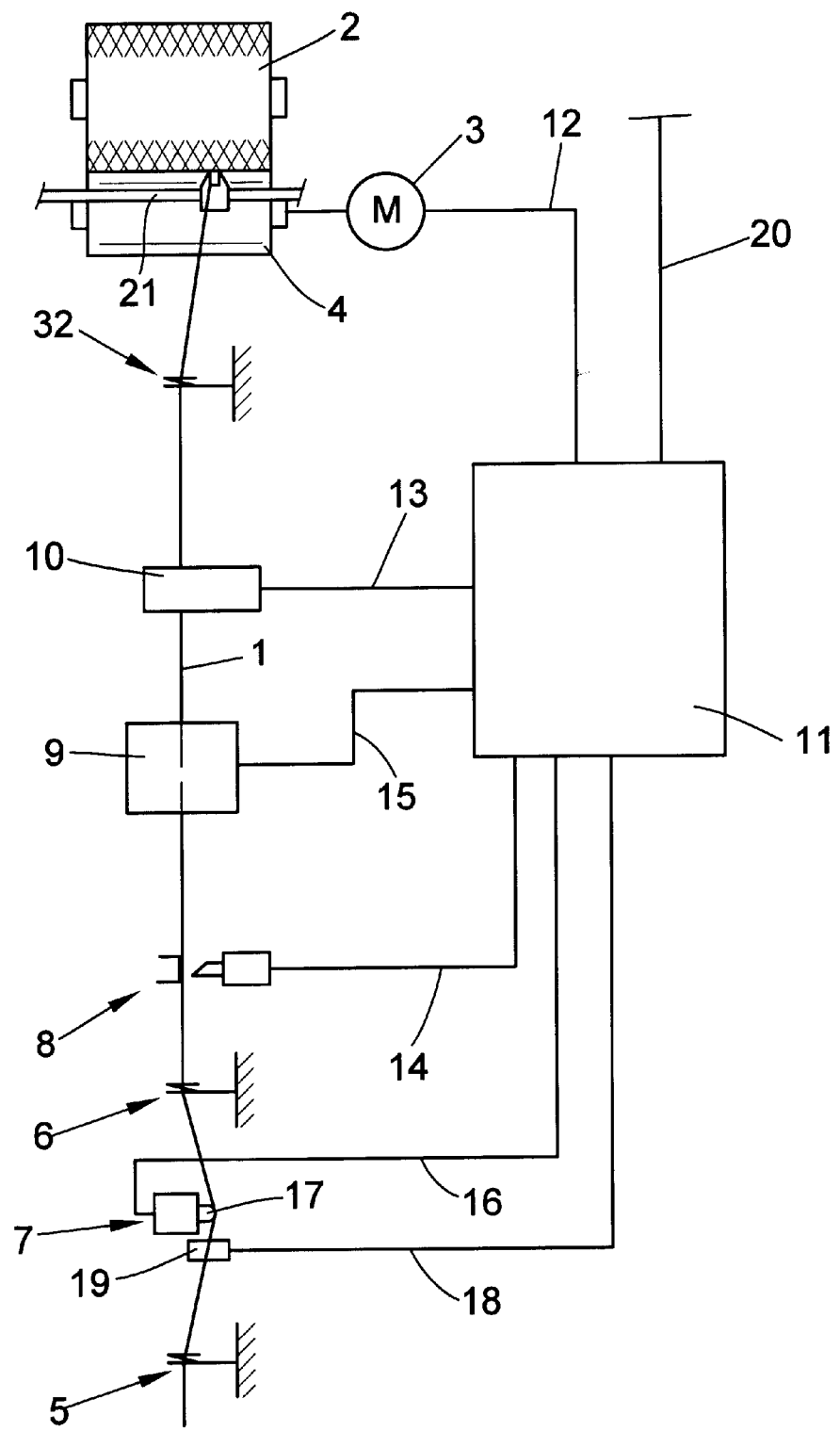
FIG. 1 is a schematic representation of a winding station with a tensile yarn force sensor in accordance with a preferred embodiment of the present invention.

Referring now to the accompanying drawing of FIG. 1, a work station of a textile machine is shown schematically, represented in this case as a single winding station of a multi-station textile winding machine by way of example, at which a yarn 1 is drawn off a yarn cop or other feed bobbin, not represented for reasons of simplification, and is delivered to and wound into a larger package in the form of cheese 2. A drive drum 4 driven by a motor 3 imparts a controlled rotary movement to the cheese 2 by frictional contact. The yarn 1 drawn off the cop travels through two yarn guides 5, 6, between which a tensile yarn force sensor 7 is arranged, following which the yarn 1 passes in sequence through a cutting device 8, a splicing device 9 a cleaner 10, and another yarn guide 32. Thereafter the yarn 1 is subjected to a cross-winding movement by means of a yarn cross-winding device 21 and is wound on the cheese 2.

A control device 11 is connected via a line 12 with the motor 3, via a line 13 with the cleaner 10, via a line 14 with the cutting device 8, via a line 15 with the splicing device 9, via a line 16 with a measuring member 17 of the tensile yarn force sensor 7, and via a line 18 with a converter 19. Another line 20 is used for data transfer to further devices for control, data storage or evaluation, and the control of further elements of the winding station or of the textile machine.

Since such winding machines and their winding stations are well known within the relevant art, as disclosed in German Patent Publications DE 195 44 202 A1 or DE 41 29 803 A1, for example, further details of the winding station are not represented for reasons of simplification and increased clarity.

During the process of winding the yarn 1 on the cheese 2, the number of revolutions of the motor 3 is controlled as a function of the measured yarn tension, and the number of revolutions of a drive mechanism of the yarn cross-winding device 21 is controlled as a function of the circumferential speed of the cheese 2 or as a function of the angular velocity of the drive drum 4 which is in frictional contact with the cheese 2.

To compensate the effect of changing influences on the measuring results, such as the effect of the temperature, for example, which could change the measured results in an impermissible manner, zero compensations are intermittently performed at the measuring member 17 of the tensile yarn force sensor 7. At predetermined times, for example ten minutes after the end of the last zero compensation, the control device 11 initiates an interruption in the traveling yarn 1, preferably in this case by actuating the cutting device 8 to sever the traveling yarn 1. This length of time between the end of the last zero compensation and the initiation of the yarn interruption is identified by $t_1$. As a result, a tensile force is no longer exerted on the measuring member 17 following the interruption of the yarn 1. At the end of a length of time $t_2$ after the initiation of the cutting device 8, the control device 11 now triggers the performance of a zero compensation at the thusly relieved measuring member 17. External influences affecting the measured result are compensated by the zero compensation. The length of time $t_2$ is selected to be such that the severed yarn 1 assuredly exerts no further force on the measuring member 17.

A further length of time $t_3$ immediately follows the length of time $t_2$, which in the exemplary embodiment preferably is one second, and is therefore of sufficient length for performing the zero compensation during the elapse of time $t_3$. The spinning process can be resumed at the end of the length of time $t_3$ following the reconnection of the yarn ends by means of the splicing device 9. The control device 11 then restarts the monitoring of a new time interval $t_2$, when the spinning process is restarted, thereby to start a new cycle.

If in the course of the time interval $t_1$, a cleaning cut is triggered in the yarn because of a flaw in the yarn or if a yarn break occurs, the control device 11 causes a zero compensation to be performed during the interruption of the travel of the yarn 1. The running cycle $t_1$ is interrupted and a new time interval $t_1$ is started upon the restart of the spinning process at the end of the zero compensation, as described above. Thus, the interrupted cycle $t_1$ is not continued, but a new cycle is started. The number of the predetermined zero compensations is reduced in this manner, without causing a reduction in the dependability of the measured result.

In an alternative embodiment, the tensile yarn force sensor 7 can be designed in such a way that it can be used for determining the yarn tension, as well as for tensioning the yarn.

Of course, as those persons skilled in the art will recognize, the present invention may be used in various other yarn handling operations, e.g., in an automatic spinning/winding machine combination wherein the yarn 1 is continuously withdrawn from a spinning station instead of being drawn off a cop.

A satisfactory extensive compensation of external influences on the measured result of the tensile yarn force sensor 7 can be achieved with the subject of the present invention, and a reduction of the dependability of the measured result can therefore be avoided.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for compensating a tensile yarn force sensor having a measuring member for detecting the tensile force of a traveling yarn during winding onto a cheese at a work station of a multi-station textile machine, wherein the yarn travels in a disposition exerting a measurable pressure on the measuring member, the device comprising a control device operable at predetermined times for actuating a cutting of the yarn and actuating a zero compensation at the measuring member thereby relieved of the pressure exerted thereon by the yarn.

2. The device in accordance with claim 1, further comprising a yarn cleaner arranged at the work station in association with the control device for actuating a cleaning cut of the yarn.

3. The device in accordance with claim 1, wherein the device is operative for actuating a zero compensation at the measuring member upon a change of the cheese being wound, a change of the supply of the yarn being wound, a break of the yarn, and a cleaning cut triggered by a lack of yarn quality.

4. The device in accordance with claim 1, wherein the control device is operative to actuate a zero compensation upon the elapse of a predeterminable length of time following an immediately preceding zero compensation.

* * * * *